United States Patent [19]
Rüedi

[11] Patent Number: 4,789,792
[45] Date of Patent: Dec. 6, 1988

[54] FEEDING OR MATCHING CIRCUIT

[75] Inventor: Beat Rüedi, Villigen, Switzerland

[73] Assignee: BBC Brown, Boveri Ltd., Baden, Switzerland

[21] Appl. No.: 842

[22] Filed: Jan. 6, 1987

[30] Foreign Application Priority Data

Jan. 16, 1986 [CH] Switzerland .......................... 140/86

[51] Int. Cl.[4] ...................... H01H 7/00; H02K 13/00
[52] U.S. Cl. .................................... 307/141; 361/415
[58] Field of Search ..................... 307/141, 141.4, 140; 361/341, 351, 355, 392, 393, 394, 428, 415; 333/32; 73/117.3; 439/638, 639

[56] References Cited

U.S. PATENT DOCUMENTS

| | | | |
|---|---|---|---|
| 3,368,117 | 2/1968 | Pond et al. | 361/415 |
| 3,564,343 | 2/1971 | Guest et al. | 361/415 X |
| 3,705,378 | 12/1972 | Elkins . | |
| 4,567,756 | 2/1986 | Colborn | 73/117.3 X |
| 4,675,769 | 6/1987 | Marshall et al. | 307/140 X |

FOREIGN PATENT DOCUMENTS

| | | |
|---|---|---|
| 129982 | 1/1985 | European Pat. Off. . |
| 1665439 | 10/1971 | Fed. Rep. of Germany . |
| 3220943 | 1/1983 | Fed. Rep. of Germany . |
| 396194 | 1/1966 | Switzerland . |

*Primary Examiner*—William M. Shoop, Jr.
*Assistant Examiner*—Sharon D. Logan
*Attorney, Agent, or Firm*—Burns, Doane, Swecker & Mathis

[57] ABSTRACT

The invention relates to a feeding or matching circuit for feeding signal circuits, conducted via a multi-pin plug-in connection, of a freely programmable control unit or of a control and instrumentation system comprising at least one electronic module which carries a part of the plug-in connection, or for matching the signal circuits to the inputs or outputs of this module. With respect to a more rational circuit construction, the connection to the supply source or the circuit components necessary for matching is provided in accordance with the invention by means of a multi-pin intermediate connector which can be plugged between the detachable parts of the plug-in connection.

16 Claims, 3 Drawing Sheets

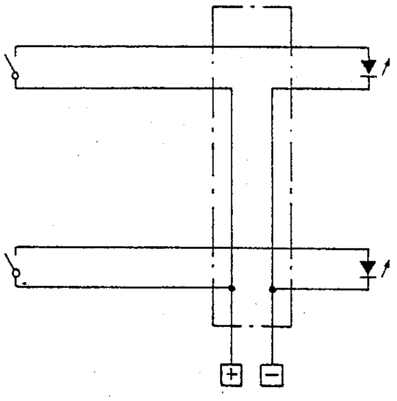
FIG. 3
FIG. 4
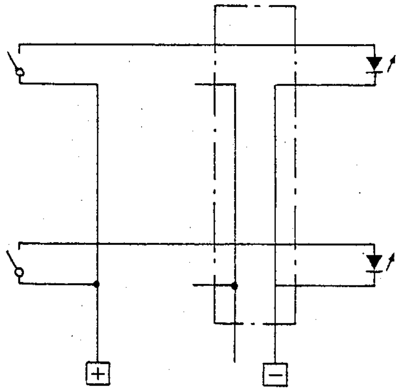
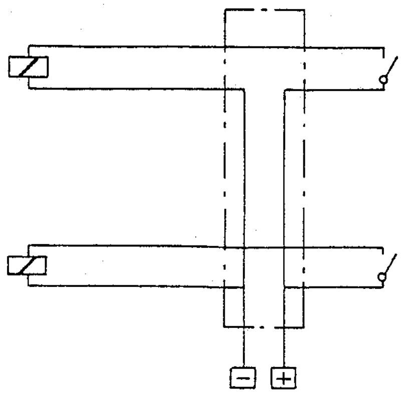
FIG. 5
FIG. 6
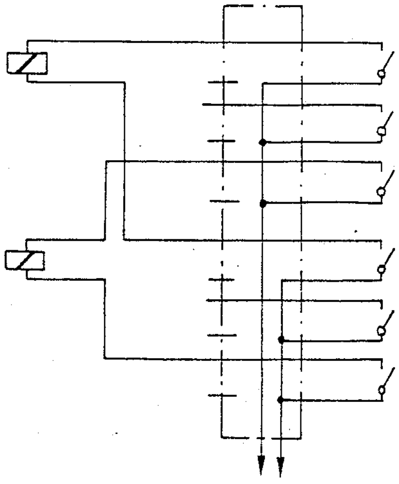

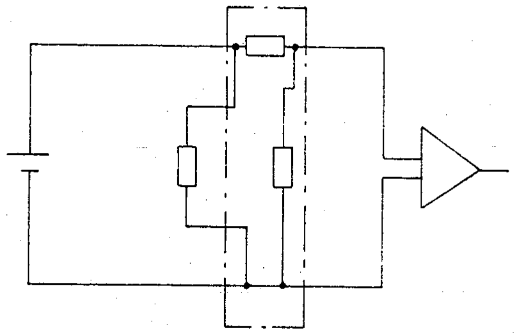
FIG. 7
FIG. 8
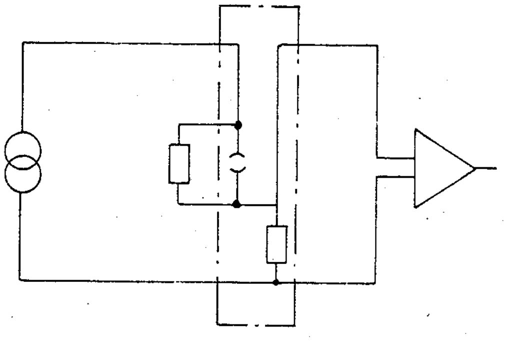
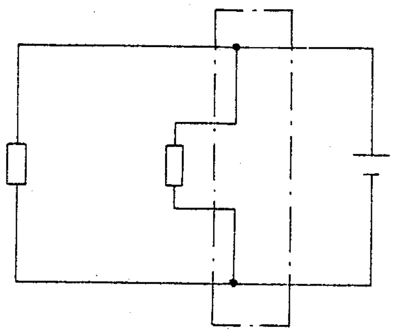
FIG. 9
FIG. 10
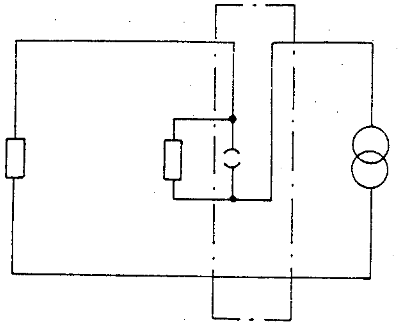

FEEDING OR MATCHING CIRCUIT

BACKGROUND OF THE INVENTION

The invention relates to a feeding or matching circuit for feeding signal circuits conducted via a multi-pin plug-in connection of a freely programmable control unit or of a control and instrumentation system comprising at least one electronic module which carries a part of the plug-in connection, or for matching the signal circuits to the inputs or outputs of this module.

The control engineering or instrumentation engineering tasks occurring in practice are of the most manifold nature and, as a rule, are different in each case of application. As far as is permitted at all by the variety of tasks to be solved, it is attempted to build up the systems as far as possible from standardized elements to minimise costs. However, compromises cannot be avoided A typical interface at which such compromises are required is, for example, the connection of the transmitters and actuators integrated into the process to inputs or outputs of electronic module in the control units or substations of the control and instrumentation systems. The problem occurring here lies, on the one hand, in the differently high signal amplitudes of the transmitters. On the other hand, supply sources must frequently be provided in the connecting circuits, especially of the actuators, which, with respect to their power capacity or their voltage or current level, resectively, cannot or not easily be integrated into the electronics of the electronic modules. Today, the electronic modules are frequently designed without consideration of the various signal amplitudes of the transmitters and without integrated supply for the transmitters and actuators. It is then left to the system constructor to match the signal amplitudes of the transmitters in each individual case to the inputs of the electronic modules, for example by means of load or shunt resistors, and to loop the connecting lines of the actuators and, as far as necessary, of the transmitters, via suitable supply voltage or supply current sources. For this purpose, the connecting lines of the elements mentioned are normally conducted to terminal strips which are arranged somewhere, for example in the switching cabinets containing the electronic modules or several such modules in module racks. From the terminal strips, the connection lines lead to multi-pin connectors which are plugged onto the modules, frequently at their front. The measures mentioned are very elaborate and form a not inconsiderable cost factor in the planning and creation of the control unit and of the control and instrumentation system, respectively.

The invention characterized in the claims achieves the object of achieving rationalization in this case.

The advantages achieved by the invention can be essentially seen in the following points:

for the system constructor, the elaborate loopings of the connecting lines of the transmitter or actuators via terminal strips are no longer necessary, which results in immediate cost savings in the planning of the control unit and of the control and instrumentation system, in its documentation and in its creation;

the electronic modules can be inexpensively developed and constructed independently of the requirements of the particular system; input circuit variants are no longer necessary; modules can be simply exchanged for each other;

the process-dependent functions are cleanly separated from the functions of the modules in the control units or substations;

all inputs and outputs at the modules can generally be of two-pin construction; if a 1 ½ pin connection is required, this can be achieved by appropriate construction of the intermediate connector;

checking of command outputs of the electronic modules is facilitated; this is because the process-side parts of the modules are still fed after the multi-pin connector has been pulled off without the intermediate connector;

a relay which is common to several signal channels of a module, for example a so-called GO relay, can be arranged outside the module and can be simply connected by means of the intermediate connector;

the solution according to the invention meets EMC requirements (EMC=electromagnetic compatibility);

the intermediate connector can also be optionally omitted, it remains possible to plug the multi-pin connector directly onto the modules;

if the intermediate connector is forgotten, no damage is produced since the supply is then missing;

if, in the case of analog inputs, the intermediate connector is pulled off together with the multi-pin connector but remains plugged onto it, the process is not influenced; this is why modules can be exchanged without influencing the process.

BRIEF DESCRIPTION OF THE DRAWINGS

Other advantages and advantageous developments of the invention as also characterized in the dependent claims are found in the subsequent explanation of illustrative embodiments, referring to the drawing, in which:

FIGS. 3 to 10 show circuit diagrams for explaining typical feeding or matching circuits which can be simply implemented by means of the intermediate connector provided in accordance with, the invention.

DETAILED DESCRIPTION OF THE PREFERRED EMBODIMENTS

Figure 1:
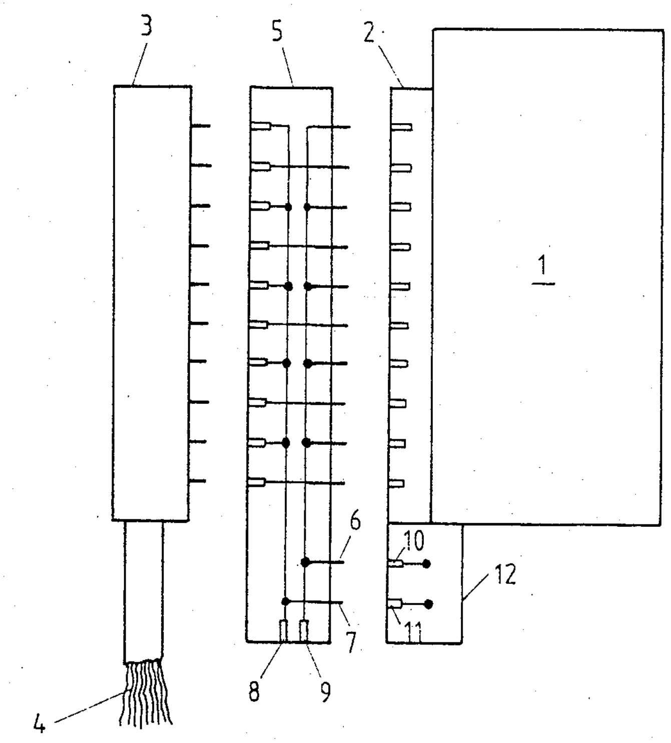
FIG. 1 shows a diagrammatic representation of a multi-pin plug-in connection with an intermediate connector provided in accordance with the invention, via which plug-in connection several connecting lines are conducted to an electronic module.

In FIG. 1, referring to reference numeral 1 designates an electronic module which can be, for example, a printed board assembly which can be inserted ino a module rack for several such modules. Module 1 is, for example, a part of the electronics of a freely programmable control unit or of the electronics of a telecontrol outstation of a control and instrumentation system. Module 1 is provided at its front with a multi-pin socket strip 2 onto which a corresponding multi-pin connector 3 can be plugged. Socket strip 2 and connector 3 form a plug-in connection via which connecting lines 4 of signal circuits are conducted which include, for example, transmitters or actuators integrated in the process to be controlled.

In FIG. 1, reference numeral 5 designates a multi-pin intermediate connector which can be plugged in between the socket strip 2 and the connector 3. Connector 3, intermediate connector 5 and socket strip 2 are shown in FIG. 1 in mutually separated condition. Of the connector pins or sockets of the plug-in connection 2, 3 and those of the intermediate connector 5, two adjacent ones should in each case be assigned in pairs to one signal circuit.

The intermediate connector 5 shown in FIG. 1 allows, for example, a common supply source to be connected in a simple and efficient manner into all signal circuits. In each case, only one of the two pins, belonging in each case to one signal circuit, of the plug-in connection 2, 3 and of the intermediate connector 5 is contacted through in the intermediate connector 5. The plug-in contacts of the other pin in each case, which are in each case a socket on the side of the intermediate connector 5 close to the connector 3 and in each case a connector pin on the side close to the socket strip 2, are conducted to four additional plug-in contacts 6 to 9 leading to the outside within the intermediate connector 5, the sockets being connected to the additional plug-in contacts 7 and 8 and the connector pins being connected to the additional plug-in contacts 6 and 9. The supply source can be connected in simple manner to the additional plug-in contacts 6 to 9.

The intermediate connector 5 shown in FIG. 1 is constructed in such a mannner that it projects over the plug-in connection 2, 3 in the plugged-in condition. In its projecting area, the additional plug-in contacts 6 to 9 are conducted to the outside, the plug-in contacts 6 and 7 being constructed as connector pins and the plug-in contacts 8 and 9 being constructed as sockets. The plug-in contacts 6 and 7 are arranged on the same side of the intermediate connector 5 as the connector pins of the terminals. As a result, they can come into contact with two sockets 10 and 11 in a two-terminal bus bar 12 arranged immediately below the socket strip 2, when the intermediate connector 5 is plugged onto the socket strip 2. Instead of being connected directly to the plug-in contacts 6 to 9, the supply source can therefore also be connected to the bus bar 12.

Figure 2:
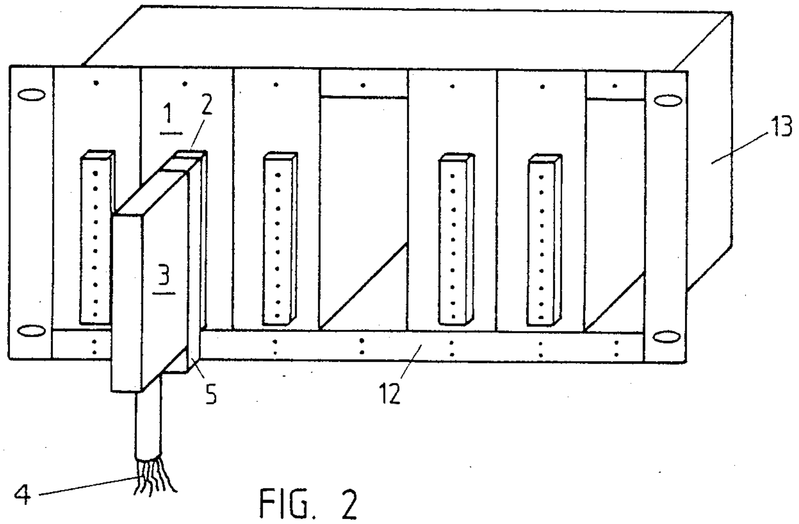
FIG. 2 shows a perspective of a module rack with several modules.

The bus bar is preferably arranged at the front of a module rack 13 below the modules which can be plugged into the module rack 13, as is shown in FIG. 2. The module rack 13 shown in FIG. 2 is not completely equipped with modules. Only one of the modules shown is designated by 1 as representative for the others. An intermediate connector according to the type of FIG. 1 and a connector 3 are plugged onto the socket strip 2 of this module 1. In FIG. 2, the intermediate connector 5 is in contact with plug-in contacts, which are not visible and which correspond to the plug-in contacts 6 and 7 of FIG. 1, with two sockets, corresponding to the sockets 10 and 11 of FIG. 1, of the bus bar 12. Such sockets are also provided in the bus bar 12 below the socket strips of the remaining modules plugged into the module rack 13 or the places provided for them, respectively. By plugging an intermediate connector 5 according to the type of FIG. 1 onto the socket strips of these remaining modules, a connection can be made in each case to the bus bar 12 and a common supply source connected to it. No elaborate connecting wiring for this purpose is necessary. In place of only one bus bar, two or more of such bus bars can also be provided at the module rack.

The plug-in contacts 8 and 9 additionally provided at the intermediate connector 5 of FIG. 1 can also be used for connecting a supply source if a connection via bus bar 12 is not desired.

The intermediate connector concept can be basically used for a large number of the most varied feeding circuits and for matching the voltage or current levels of the signal circuits to the inputs or outputs of the modules. In FIGS. 3 to 10, some typical, frequently occurring feeding or matching problems are shown which can be solved by elegant circuit means using an intermediate connector. FIGS. 3 to 10, per se, show circuit diagrams but the line sections extending within the dot-dashed line and the circuit elements represented therein should be spatially integrated in an intermediate connector in each case. The line sections and circuit elements shown in the right-hand part of the figure should be spatially arranged in each case within a module, but those in the left-hand part of the figure should be arranged on the process side on the other side of the connector. In FIGS. 3 to 10, only two signal circuits are shown in each case but these are only intended to be representative of a plurality of these.

The signal circuits of FIG. 3 have so-called signal devices on the process side and light-emitting diodes of octocouplers in the module. A supply source is connected into one in each case of the connecting lines of both signal circuits by means of the intermediate connector. These inputs are two signaling inputs of the module.

FIG. 4 corresponds to FIG. 3 apart from the fact that a connection to only one of the terminals of the supply source is established by means of the intermediate connector. The corresponding intermediate connector would therefore only have the plug-in contacts 6 or 9 of FIG. 1. This type of connection is called a one/two-pin connection. Nevertheless, connection to the module remains a uniform two-pin connection.

The signal circuits of FIG. 5 have contactors in the process and contacts in the module. The circuits are two command outputs of the module. A supply source is connected in a two-pin connection into one in each case of the connecting lines of both circuits, as in FIG. 3.

In FIG. 6, two command outputs are also shown which, however, are subject to common control by an external so-called GO relay providing a pulse command. The GO relay is connected with a two-pin connection by means of the intermediate connector. Arrangement of the GO relay on the module, which is frequently undesirable, can be avoided since it can be simply connected by means of the intermediate connector. In particular, one GO relay can be jointly connected in series with several modules by means of the bus bar concept. In this case, the bus bar represents a signal line. It must here be noted that in the intermediate connector only plug-in contacts of its side close to the module are connected to the additional plug-in contacts whereas this corresponding plug-in contacts on the other side are not connected.

FIG. 7 shows a source, for example an active transmitter, on the process side and an amplifier as a first sink within the modules. To match the source voltage to the amplifier, resistance elements are provided integrated in the intermediate connector. Pins of the intermediate connector not occupied by the signal circuits can be used, for example, for connecting a second sink, for example a recorder or similar. For this purpose, connections between its plug-in contacts are required in the intermediate connector on the side close to the process whereas this corresponding plug-in contacts on the side close to the module are again not connected. The illustration is intended to convey that the connecting lines of the two sinks are conducted via the multi-pin connector.

FIG. 8 largely corresponds to FIG. 7, with the only difference that the source on the process side is here a current source and the intermediate connector contains a shunt resistor. As in FIG. 7, connection of a second sink is shown. This can be short-circuited, for example with a shoht-circuit connector which can be plugged into the intermediate connector.

FIG. 9 and FIG. 10 show the matching of signal circuits to a voltage source or a current source in the module and sinks in the process.

So that the system constructor is given the possibility of individual matching, the circuit elements in the intermediate connector should be accessible and exchangeable.

The intermediate connector can also be used for establishing a connection between inputs or outputs of at least two adjacent modules plugged into a module rack. This is necessary, for example, when signal circuits have to be conducted via two adjacent modules which can be connected in eacn case via a socket strip at their front.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

I claim:

1. An interconnection circuit for feeding signal circuits, conducted via a multi-pin plug-in connection having a first multi-pin socket strip and a first multi-pin connector of one of a freely programmable control unit and a control and instrumentation system comprising at least one electronic module which carries one of said first multi-pin socket strip and said first multi-pin connector of said plug-in connection, wherein a connection to a supply source of said feeding circuit is a multi-pin intermediate connector having a second multi-pin connector and a second multi-pin socket strip and adapted to be plugged between said first multi-pin socket strip and said first multi-pin connector of said multi-pin plug-in connection.

2. A circuit as claimed in claim 1, wherein for at least one of said pins of said intermediate connector, no internal connection exists between said second multi-pin connector and said second multi-pin socket strip and wherein at least one pin connector or one pin socket of said one pin is internally connected with at least one additional pin connector or pin socket leading to the exterior of the intermediate connector.

3. A circuit as claimed in claim 2, wherein a bus bar is provided with which at least one of said additional pin connector, said additional pin socket, said second pin connector and said second pin socket of the intermediate connector come into contact when the intermediate connector is plugged onto one of said first multi-pin connector and said first multi-pin socket strip of said multi-pin plug-in connection.

4. A circuit as claimed in claim 3, wherein the bus bar is arranged at a module rack for several modules, such that at least a number of said additional pin connectors or pin sockets of several intermediate connectors can come into contact with said bus bar when each of said several intermediate connectors is plugged onto a respective one of said several modules located in the module rack.

5. A circuit as claimed in claim 3, wherein said intermediate connector, in addition to said at least one additional pin connector or pin socket which comes into contact with said bus bar, has at least one further parallel additional pin connector or pin socket which is freely accessible from the exterior of said intermediate connector.

6. A circuit as claimed in claim 2, wherein at least one of the terminals of the supply source is connected either directly or via said bus bar to one of said additional pin connectors or pin sockets of said intermediate connector.

7. A circuit as claimed in claim 2, wherein at least one of the connections of a GO relay is connected either directly or via the bus bar to one of said additional pin connectors or pin sockets of said intermediate connector.

8. A circuit as claimed in claim 1, wherein a connection between at least two adjacent modules in a module rack can be established by means of the intermediate connector.

9. An interconnection circuit for matching signal circuits with terminals of at least one electronic module, said signal circuits and said terminals being connected via a multi-pin plug-in connection including a first multi-pin socket strip and a first multi-pin connector of one of a freely programmable control unit and a control and instrumentation system comprising said at least one electronic module which carries one of said first multi-pin socket strip and said first multi-pin connector of said plug-in connection, wherein a connection to circuit components of said matching circuit is a multi-pin intermediate connector having a second multi-pin connector and a second multi-pin socket strip and adapted to be plugged between said first multi-pin socket strip and said first multi-pin connector of said multi-pin plug-in connection.

10. A circuit as claimed in claim 9, wherein for at least one of said pins of said intermediate connector, no internal connection exists between said second multi-pin connector and said second multi-pin socket strip and wherein at least one pin connector or one pin socket of said one pin is internally connected with at least one additional pin connector or pin socket leading to the exterior of the intermediate connector.

11. A circuit as claimed in claim 10, wherein a bus bar is provided with which at least one of said additional pin connector, said additional pin socket, said second pin connector, and said second pin sockets of the intermediate connector come into contact when the intermediate connector is plugged onto one of said first multi-pin connector and said first multi-pin socket strip of said multi-pin plug-in connection.

12. A circuit as claimed in claim 11, wherein the bus bar is arranged at a module rack for several modules, such that at least a number of said additional pin connectors or pin sockets of several intermediate connectors can come into contact with said bus bar when each of said several intermediate connectors is plugged onto a respective one of said several modules located in the module rack.

13. A circuit as claimed in claim 11, wherein said intermediate connector, in addition to said at least one additional pin connector or pin socket which comes into contact with said bus bar, has at least one further parallel additional pin connector or pin socket which is freely accessible from the exterior of said intermediate connector when the intermediate connector is plugged.

14. A circuit as claimed in claim 10, wherein at least one of the terminals of the supply source is connected either directly or via said bus bar to one of said additional pin connectors or pin sockets of said intermediate connector.

15. A circuit as claimed in claim 9, wherein the intermediate connector includes at least one electronic circuit element used for matching.

16. A circuit as claimed in claim 9, wherein a connection between at least two adjacent modules in a module rack can be established by means of the intermediate connector.

* * * * *